United States Patent
Hermann

(10) Patent No.: US 12,340,539 B2
(45) Date of Patent: Jun. 24, 2025

(54) CALIBRATION OF CAMERA-BASED HEIGHT ASSESSMENT

(71) Applicant: FORD GLOBAL TECHNOLOGIES, LLC, Dearborn, MI (US)

(72) Inventor: Thomas J. Hermann, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 158 days.

(21) Appl. No.: 18/479,215

(22) Filed: Oct. 2, 2023

(65) Prior Publication Data

US 2025/0111537 A1    Apr. 3, 2025

(51) Int. Cl.
| | |
|---|---|
| *G06T 7/80* | (2017.01) |
| *G06T 7/55* | (2017.01) |
| *G06T 7/60* | (2017.01) |
| *G06V 20/58* | (2022.01) |

(52) U.S. Cl.
CPC .................. *G06T 7/80* (2017.01); *G06T 7/55* (2017.01); *G06T 7/60* (2013.01); *G06V 20/582* (2022.01); *G06T 2207/30261* (2013.01)

(58) Field of Classification Search
CPC .... G06T 7/80; G06T 7/55; G06T 7/60; G06T 2207/30261; G06T 2207/30252; G06V 20/582; G06V 20/58
See application file for complete search history.

(56) References Cited

U.S. PATENT DOCUMENTS

| | | | |
|---|---|---|---|
| 9,269,263 B2 | 2/2016 | Gieseke | |
| 10,229,596 B1* | 3/2019 | Weinberg | G06V 20/58 |
| 10,675,928 B2* | 6/2020 | Barnichon | B60C 25/0551 |
| 11,373,415 B2 | 6/2022 | Rider et al. | |
| 2006/0129292 A1* | 6/2006 | Ohkubo | B60W 50/14 701/38 |
| 2012/0081218 A1* | 4/2012 | Nugent | B60Q 9/008 340/431 |
| 2013/0222592 A1* | 8/2013 | Gieseke | G08G 1/096708 348/148 |
| 2024/0013555 A1* | 1/2024 | Phan | G06T 7/33 |
| 2024/0161342 A1* | 5/2024 | Sen | G01S 17/89 |

FOREIGN PATENT DOCUMENTS

| | | |
|---|---|---|
| CN | 113808218 A | 12/2021 |
| CN | 115830854 A | 3/2023 |

* cited by examiner

*Primary Examiner* — Richard M Camby
(74) *Attorney, Agent, or Firm* — Frank L. Lollo; MacMillan, Sobanski & Todd, LLC

(57) ABSTRACT

Distances between spatial features such as a clearance height of a bridge over a roadway are determined based on camera images captured in a moving vehicle. A stream of images is captured. The presence of bridge overpasses is recognized in the images. A range between the vehicle and the bridge overpasses is detected at which each respective image is captured. A height of each respective bridge overpass is photometrically determined according to the respective detected range, a respective location on the respective bridge overpass, and a calibration factor. A posted height is recognized in a respective image of a respective one of the bridge overpasses. The calibration factor is revised according to a discrepancy between the respective posted height and the respective photometrically determined height. In succeeding determinations of the monitored distances, the revised calibration factor is employed.

15 Claims, 5 Drawing Sheets

| | Bridge | Posted | Est. 1 | Est. 2 | Est. 3 |
|---|---|---|---|---|---|
| 41 | $i$ | $x_1$ | $x_2$ | $x_3$ | $x_4$ |
| 42 | $i+1$ | $y_1$ | $y_2$ | | |
| | $i+2$ | $z_1$ | $z_2$ | $z_3$ | $z_4$ |
| | ⋮ | | | | |

40

CALIBRATION OF CAMERA-BASED HEIGHT ASSESSMENT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to advanced driver assistance systems in transportation vehicles, and, more specifically, to calibrating image analysis processes for recognizing the sizes of objects in camera images, such as the size of a clearance height beneath a bridge overpass.

Advanced driver assistance systems may often employ cameras or other image sensors to obtain visual information about an external environment around a motor vehicle for the purpose of identifying obstacles and/or assisting in guiding the vehicle along a travel path. In some cases, camera images may be examined to extract posted textual information such as a clearance height beneath an upcoming bridge overpass.

Camera images can also be analyzed to derive an actual distance between a pair of spatial features depicted in the images. The pair of spatial features may be opposite edges of a particular object (i.e., for detecting size of the object) or may be associated with different objects (i.e., for detecting a separation distance between the objects. One known function relates to the detection of the clearance height (above the ground) of bridge overpasses beneath which a vehicle is about to drive when there is no signage displaying the bridge clearance. Once the bridge height is obtained, it can be compared to the height of the host vehicle so that the driver can be alerted whenever there may be insufficient clearance. This applies to commercial trucks as well as passenger cars and trucks, which may also be towing a trailer. The vehicle and/or trailer may be loaded with cargo or have other tall structures such as roof mounted items like air conditioning units, vents, antennas, or luggage carriers which may be prone to strike an overpass. It is known in the art to obtain a vehicle height using a manual input from the driver or by automatic detection (which may be onboard the vehicle or obtained from roadway infrastructure).

A front facing camera can be used to identify an approaching bridge. When not otherwise available, the height of the bridge can be calculated from camera images based on geometric analysis. For example, an apparent angular size of the clearance space measured between the lowest edge of the bridge and the underlying road surface together with the range (i.e., distance) between the vehicle and the bridge when the image is captured can be used to calculate an actual size (e.g., clearance height). Other equivalent calculations have also been used.

When determining an actual size based on a camera image, the calculations involve calibration factors relating to the optical properties of the camera such as focal length, magnification, and focal plane. Some such factors may be subject to drift over time or as a result of varying environmental conditions. For example, an assumed reference frame for analyzing images (e.g., an image location nominally representing a horizontal extension from the vehicle at ground level) may change as a result of cargo loads. Measured variables (e.g., distance) may be obtained from vehicle sensors (e.g., a wheel rotation sensor) for which additional calibrations are also needed. However, the known calibrations have not provided sufficient accuracies over sufficiently long periods of usage.

SUMMARY OF THE INVENTION

The present invention introduces an ongoing re-calibration that improves accuracy of image processing for detecting actual distances as depicted in camera images. Reference data is obtained whenever there is signage posted in the vicinity of a bridge overpass giving an actual bridge height for the respective bridge. Even though the bridge clearance height is already known from the signage, a value for the clearance height is calculated from the apparent size in the camera image data using the currently active calibration values. Automatic re-calibration is performed by adjusting one or more calibration factors when there is a discrepancy between the posted height and the calculated height.

In one aspect of the invention, a method is provided for monitoring distances between spatial features based on camera images in a moving vehicle. A stream of images is captured. The presence of bridge overpasses is recognized in the images. A range between the vehicle and the bridge overpasses is detected at which each respective image is captured. A height of each respective bridge overpass is photometrically determined according to the respective detected range, a respective location on the respective bridge overpass, and a calibration factor. A posted height is recognized in a respective image of a respective one of the bridge overpasses. The calibration factor is revised according to a discrepancy between the respective posted height and the respective photometrically determined height. In succeeding determinations of the monitored distances, the revised calibration factor is employed.

DETAILED DESCRIPTION OF PREFERRED EMBODIMENTS

Figure 1:
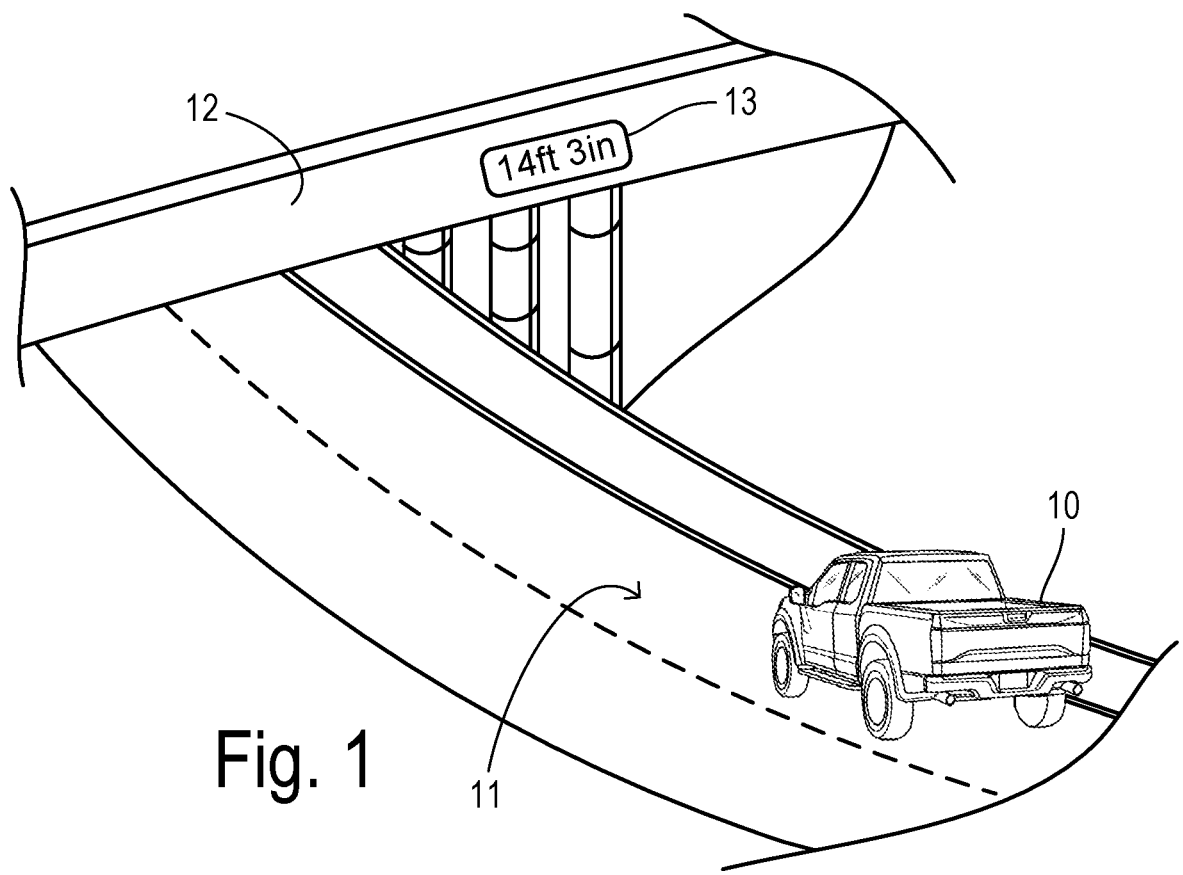
FIG. 1 is a schematic diagram showing a vehicle approaching a bridge overpass having a posted height.

Referring to FIG. 1, a vehicle 10 traveling on a road surface 11 is shown as it approaches a bridge overpass 12. A traffic sign 13 posted on or near bridge overpass 12 includes textual information informing a driver of the clearance height between a bottom edge of bridge overpass 12 (a first point) and a position on road surface 11 beneath bridge overpass 12 (a second point). An automatic system using camera images can compare the indicated clearance height to a known vehicle height to determine whether there is any chance of the clearance height being insufficient. The present invention further utilizes the clearance height information from traffic sign 13 to calibrate or re-calibrate a camera-based scene analysis which is performed by automatic systems within vehicle 10.

Figure 2:
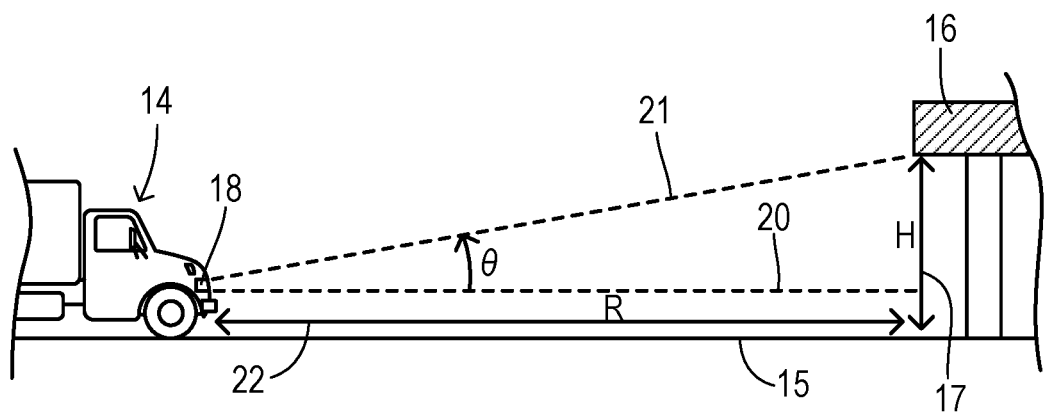
FIG. 2 is a schematic diagram showing a geometric relationship between an apparent visual angle, range, and actual size.

FIG. 2 illustrates how a bridge clearance height can be photometrically determined using camera images captured within a vehicle 14. A photometric analysis can be based on geometric (e.g., trigonometric) techniques or an equivalent. Vehicle 14 moves on a road surface 15 toward a bridge overpass 16 with a clearance height (H) 17 between road surface 15 and a bottom side of bridge overpass 16. A camera 18 captures images with a field of view including bridge overpass 16, road surface 15, and surrounding areas. Within the field of view, rays 20 and 21 extend from vehicle 14 toward bridge overpass 16. Ray 20 may be horizontal (i.e., in parallel with road surface 15), and ray 21 coincides with a bottom edge of bridge overpass 16. The bottom edge is preferably the lowest edge so that it defines the most restrictive clearance (which is usually at the lateral side of the bridge facing oncoming traffic).

Figure 3:
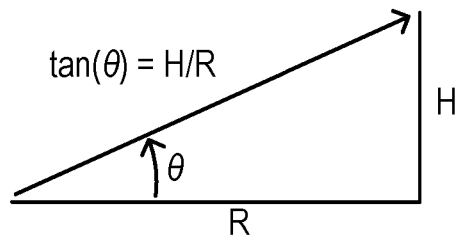
FIG. 3 illustrates the trigonometric relationship between the visual angle, range, and actual size.
Figure 4:
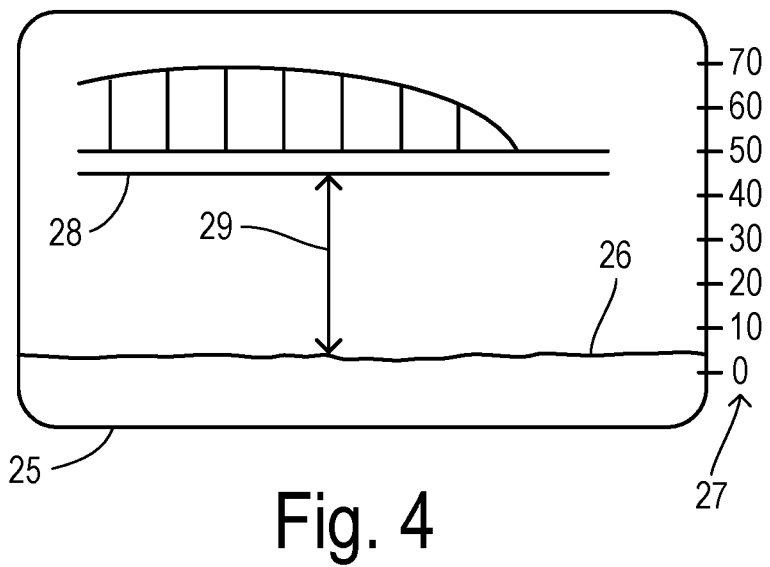
FIG. 4 shows image data for a bridge overpass.

When a respective image is captured, vehicle 14 is at a range (R) shown by a line 22 between vehicle 14 and an entry point beneath bridge overpass 16. Using trigonometric relationships as shown in FIG. 3, an angular size θ and range R can be used to derive the height H according to the tangent of angle θ. Specifically, height H is equal to the tangent of angle θ multiplied by range R. There are many ways to implement use of this photometric determination. For example, the angle θ may be defined according to horizontal ray 20 as shown in FIG. 2, which results in the height determination being a measured from the height of camera 18. Consequently, a final value H for the clearance height would need to be increased by the camera height above the ground. In other embodiments, rays 20 and 21 defining the optical angle θ may be ascertained according to the locations in the camera image of the lower end of the bridge overpass and the top surface of the road beneath the bridge overpass. For example, FIG. 4 shows a camera image 25 depicting a road surface 26, a bridge overpass 28, and an intervening clearance height 29. A camera may typically provide a fixed field of view, wherein specific locations in the field of view (e.g., specific pixel rows) correspond to fixed angular directions with respect to the vehicle. Respective angular elevations can be mapped to particular pixel rows in image 25 as shown by scale 27. Thus, in some embodiments, angle θ can be found by identifying which pixel row contains a lowest edge of the bridge overpass and which pixel row contains the road surface beneath the identified lowest edge. The image distance between the two pixel rows (e.g., the difference between the corresponding row values read from scale 27) determines angle θ.

Figure 5:
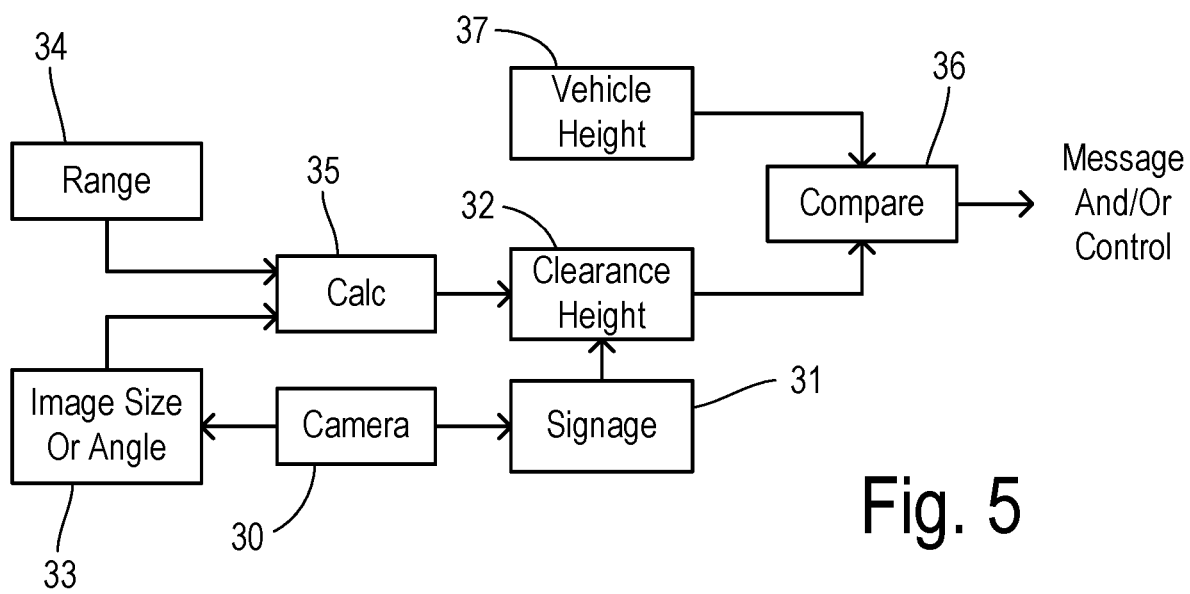
FIG. 5 is a block diagram showing one preferred apparatus of the invention.

FIG. 5 shows a block diagram for an implementation of a clearance notification system based on camera images obtained from a camera 30. When signage is present which provides a bridge height, than the clearance height is detected by a sign recognition block 31 which analyzes a scene to read the posted clearance height. When signage is not detected having any clearance height information, then images from camera 30 are provided to an image analyzer 33 for determining an image size or angle corresponding to the point-to-point clearance features (e.g., the ground and bottom edge of overpass). The corresponding range to the bridge overpass from the vehicle is determined in a block 34, and the range R is provided along with the image size or angle to a calculation block 35 for performing the photometric analysis yielding a clearance height. A clearance height collected in a block 32 (based on signage 31 or calculator 35) is provided to a comparison block 36. A known vehicle height 37 which may be derived manually or automatically is also provided to comparison block 36, and whenever a difference between the clearance height and vehicle height is less than a predetermined threshold then a notification action or a control action are initiated by comparison block 36.

As the bridge monitoring is proceeding, a database of bridge clearance heights including both the respective posted heights and respective estimated heights calculated for corresponding bridge overpasses using camera images is compiled for calibration purposes. Thus, a database 40 may include recorded entries 41 and 42 compiling data for respective bridges (denoted i and i+1). For bridge i, a posted height $x_1$ is recorded and estimated clearance heights $x_2$, $x_3$, and $x_4$ are recorded. Multiple height estimates can be calculated for a single approach to a particular bridge overpass using camera images obtained at different times from different ranges. The multiple estimates can be combined for improved accuracy (e.g., by using a mean or a median value). For bridge i+1, a posted height $y_1$ is recorded an estimated clearance height $y_2$ is recorded. A single estimate is all that is necessary for comparing to the posted height in order to potentially update a calibration factor as described below.

Figures 6, 7:
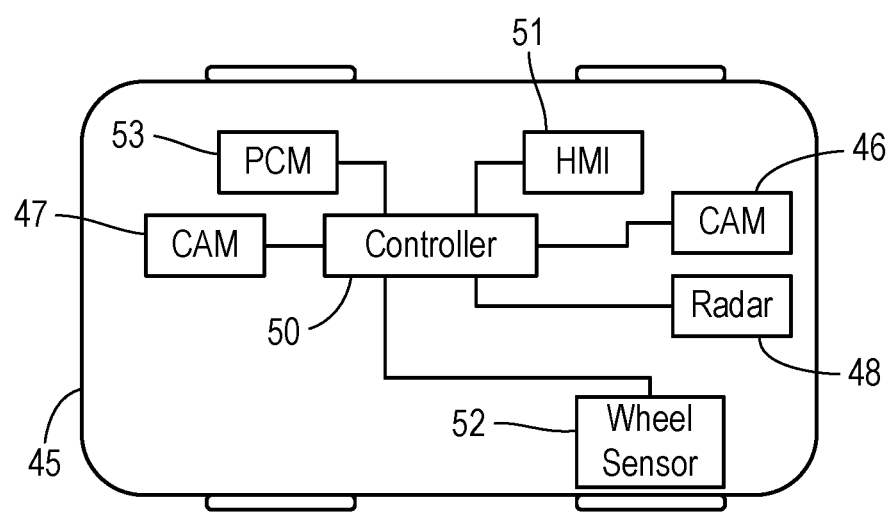
FIG. 6 shows a data table obtained by collecting estimated bridge heights.
FIG. 7 is a block diagram showing a vehicle configured to implement the invention.

FIG. 7 shows a vehicle 45 configured to estimate clearance heights using data collected during vehicle operation. An image sensor such as a camera 46 is mounted on vehicle 45 to capture a stream of images directed externally forward from vehicle 45. Images may also be captured using a rearward directed camera 47. Cameras 46 and 47 are coupled to a controller 50 which may be comprised of a microcontroller-based electronic module configured according to the present invention.

A time of flight sensor 48 (e.g., a radar or lidar) is mounted on vehicle 45 for determining a range between vehicle 45 and distinct objects or surfaces which may be depicted in the captured images. A human machine interface 51 is coupled to controller 50 to enable manual interaction and communication with a user (e.g., entering of a height of a topmost portion of the vehicle, and providing messages to a driver when an insufficient clearance is detected). A wheel sensor 52 is also coupled to controller 50 to be used for measuring a range between a location where a respective images are captured and the locations of objects depicted in the captured images. A powertrain control module (PCM) 53 is coupled to controller 50 which can also be useful for measuring the range. PCM 53 can also be configured to take evasive actions in response to a determination that vehicle 50 is headed into a bridge overpass with insufficient clearance.

Figure 8:
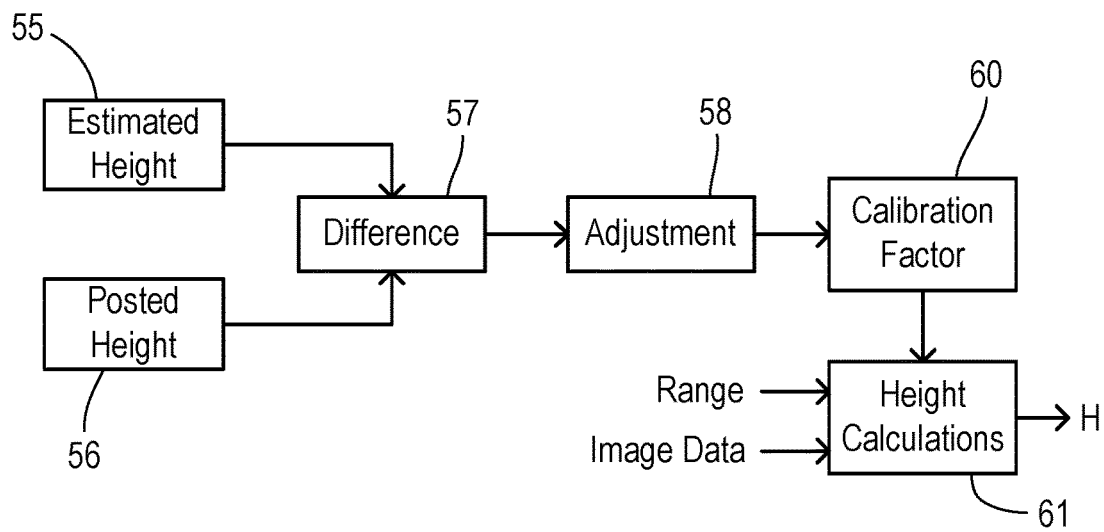
FIG. 8 is a block diagram showing a preferred apparatus for updating a calibration factor.

FIG. 8 is a block diagram showing an example structure for updating calibration factors for use in calculating clearance heights (or for calculating any other distances between two spatial features on captured images). An estimated height in a block 55 which is calculated for a particular bridge seen in a respective image is sent to one input of a difference block 57. A posted height 56 which is recognized from signage found in the captured image is provided to another input of difference block 57. Based on the difference between the estimated height and the posted height, an adjustment block 58 calculates an adjustment to be made in a calibration factor 60. The updated calibration factor 60 is input to a calculation block 61 which performs actual height calculations using image data and range data to estimate clearance heights of bridge overpasses for which there is no posted height (or for detecting actual sizes of any other imaged objects as desired).

Figure 9:
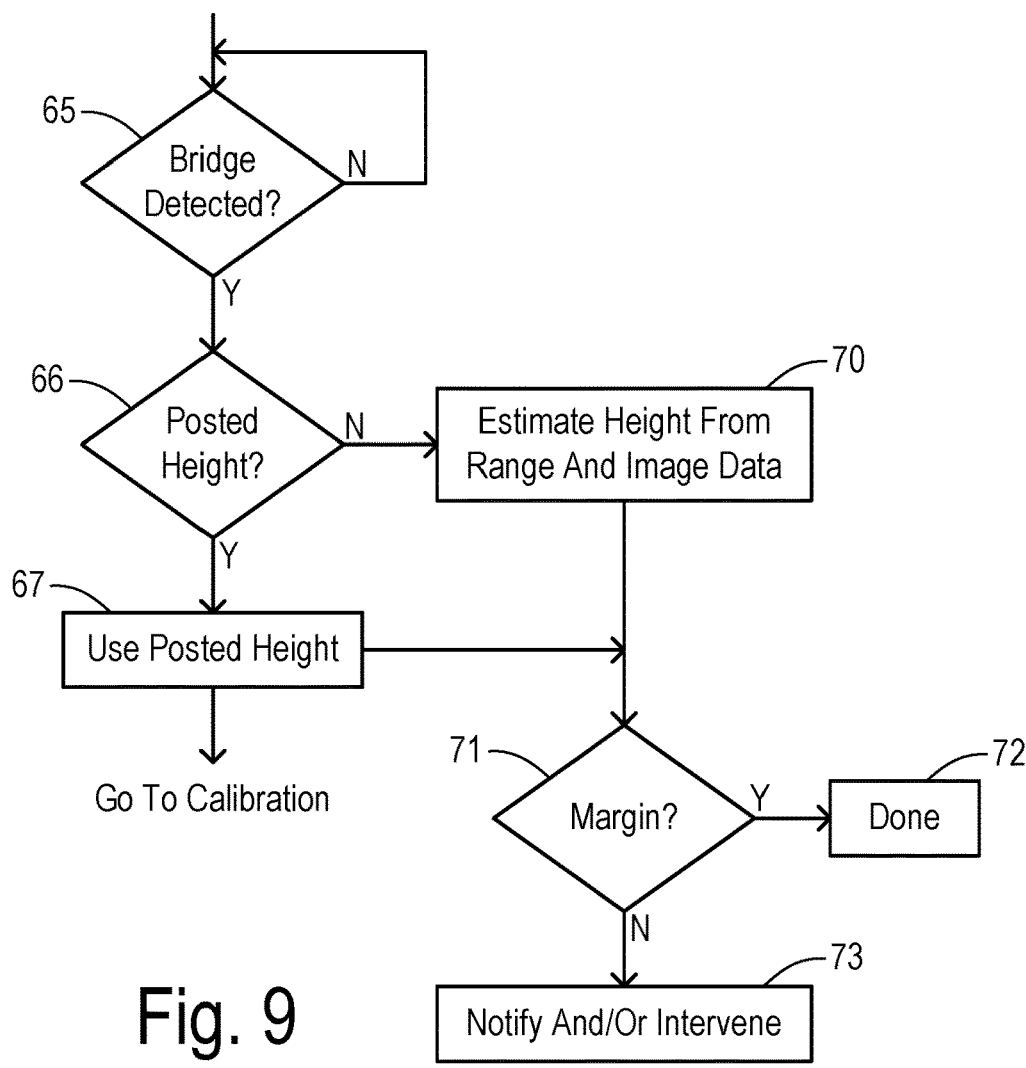
FIG. 9 is a flowchart showing a method for monitoring bridge height.

FIG. 9 shows a flowchart of one preferred method for monitoring bridge overpass heights and for providing information to a driver whenever a clearance may be insufficient. In step 65, camera images which are continuously being captured are reviewed for the appearance of a bridge overpass. If no bridge is detected, then step 65 continues to monitor the stream of images. When a bridge overpass is detected in step 65 then a respective captured image is analyzed in step 66 to determine whether there is any signage with a clearance height posted for the bridge overpass. If a posted height is not present, then the bridge clearance height is estimated in step 70 according to a measured range between the vehicle and bridge overpass and the relative positions of the road surface and bottom of the bridge overpass shown in respective image data. In step 71, the estimated clearance height is compared to the nominal height of the vehicle to determine whether there is a sufficient clearance margin. If the margin is sufficient then the process completes in step 72 (and once the encounter with the current bridge overpass is completed then a return may be made to step 65). If insufficient margin is found in step 71, then the driver may be notified and/or automatic intervention such as slowing or stopping the vehicle can occur in step 73.

When a posted height is found in step 66, then the posted height is recognized and used in step 67. In particular, the posted height may be used to perform a calibration feature (e.g., as shown in FIG. 8) in parallel with using the posted height in step 71 for determining the margin instead of the estimated height.

Figure 10:
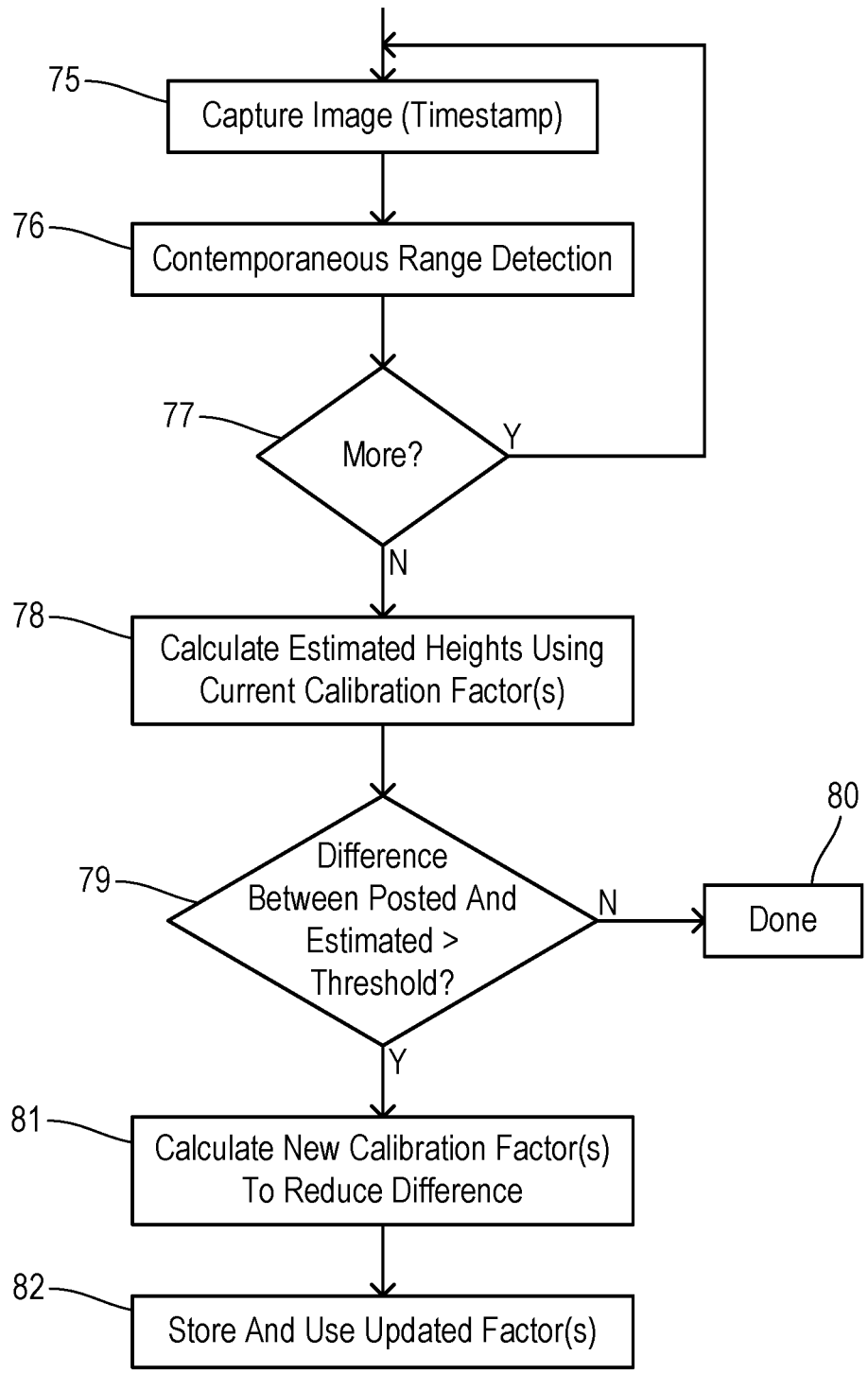
FIG. 10 is a flowchart showing a method updating calibration factors during the monitoring of bridge height.

FIG. 10 shows a flowchart of another preferred method for updating the calibration factors after detecting a posted height in step 67. In step 75, captured images are associated with respective timestamps, enabling them to be associated with contemporaneous range detections in step 76. The range detection which is contemporaneous with a respective captured image may be determined at the same time (e.g., using time-of-flight data) or may be obtained at a later time after the vehicle has actually traveled the distance from the image location and the bridge overpass. A decision is made in step 77 to determine whether there will be additional attempts to obtain captured images and range data for additional locations during movement of the vehicle toward the same bridge overpass. If so, then additional images and ranges may be captured at steps 75 and 76. Once there are no more images to be obtained, the estimated clearance heights are calculated in step 78 for each respective captured image using the current value of the calibration factors. A check is performed in step 79 to determine whether a difference between the posted clearance height and the estimated clearance heights are greater than a threshold. If not, then no adjustment to the calibration factors are needed and the process ends at step 80. Otherwise, at least one new calibration factor is calculated in step 81 to reduce the difference. In step 82, the new calibration factor is stored and then is used in subsequent calculations for estimating bridge overpass clearance heights or other distances between spatial features in captured images.

What is claimed is:

1. A method for monitoring distances between spatial features based on camera images in a moving vehicle, comprising the steps of:
    capturing a stream of images;
    recognizing presence of bridge overpasses in the images;
    detecting a range between the vehicle and the bridge overpasses at which each respective image is captured;
    photometrically determining a height of each respective bridge overpass according to the respective detected range, a respective location on the respective bridge overpass, and a calibration factor;
    recognizing in a respective image a posted height of a respective one of the bridge overpasses;
    revising the calibration factor according to a discrepancy between the respective posted height and the respective photometrically determined height; and
    employing the revised calibration factor for succeeding determinations of the monitored distances.

2. The method of claim 1 wherein the succeeding determinations of the monitored distances is comprised of determining a height of bridge overpasses for which there is not a respective posted height.

3. The method of claim 1 wherein the step of revising the calibration factor is conditioned upon the discrepancy being a height difference which is greater than a threshold.

4. The method of claim 1 wherein the step of photometrically determining the height is comprised of detecting a vertical pixel position of the respective location on the respective bridge overpass in the respective image.

5. The method of claim 4 wherein the vertical pixel position of the respective location is compared to a vertical position of a ground surface.

6. The method of claim 1 wherein the range is detected according to signals from a wheel sensor during traveling of the moving vehicle between a position where a respective image is captured and a position where the moving vehicle is located at a side of the respective bridge overpass.

7. The method of claim 1 wherein the range is detected according to time-of-flight signals reflected between the moving vehicle and the respective bridge overpass at a time when a respective image is captured.

8. A transportation vehicle comprising:
    an image sensor for capturing a stream of images directed externally from the transportation vehicle;
    a location sensor for detecting a range between the transportation vehicle and a respective bridge overpass that is depicted in a respective image in the stream of images; and
    a controller configured for (A) recognizing presence of the respective bridge overpass, (B) photometrically determining a height of the respective bridge overpass according to the respective detected range, a respective location on the respective bridge overpass, and a calibration factor, (C) recognizing in the respective image a posted height of the respective bridge overpass, (D) revising the calibration factor according to a discrepancy between the respective posted height and the respective photometrically determined height, and (E) employing the revised calibration factor for making determinations of point-to-point distances in subsequent images in the stream of images.

9. The transportation vehicle of claim 8 wherein the point-to-point distances in subsequent images are comprised of clearance heights of respective bridge overpasses.

10. The transportation vehicle of claim 8 wherein the point-to-point distances in subsequent images are comprised of sizes of objects depicted in the subsequent images.

11. The transportation vehicle of claim 8 wherein revising the calibration factor is conditioned upon the discrepancy being a height difference which is greater than a threshold.

12. The transportation vehicle of claim 8 wherein photometrically determining the height is comprised of detecting a vertical pixel position of the respective location on the respective bridge overpass in the respective image.

13. The transportation vehicle of claim 12 wherein the vertical pixel position of the respective location is compared to a vertical position of a ground surface.

14. The transportation vehicle of claim 8 further comprising a wheel sensor for detecting the range between a position where a respective image is captured and a position where the moving vehicle is located at a side of the respective bridge overpass.

15. The transportation vehicle of claim 8 further comprising a time-of-flight sensor for detecting the range according to signals reflected between the transportation vehicle and the respective bridge overpass at a time when the respective image is captured.

* * * * *